March 12, 1935.  H. WAKER  1,993,765
COMBINED LAMP AND HORN
Filed Oct. 12, 1932   2 Sheets-Sheet 2
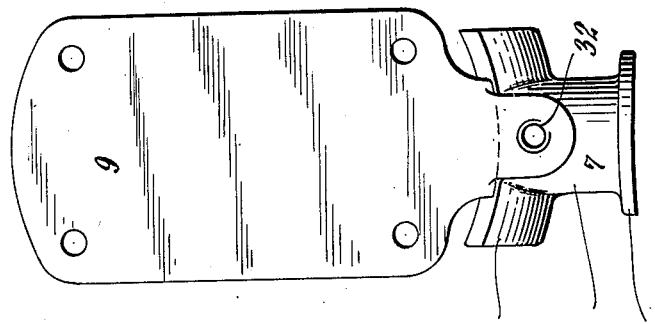
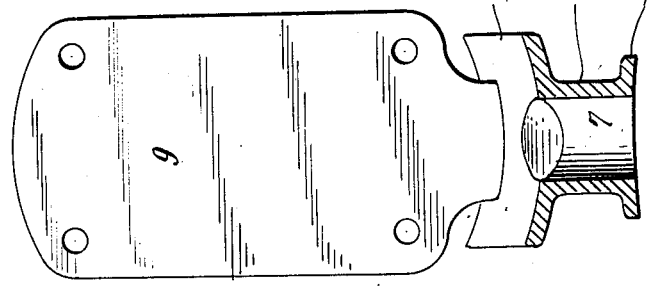
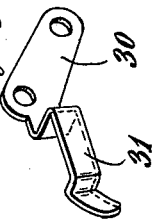
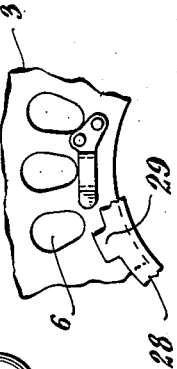
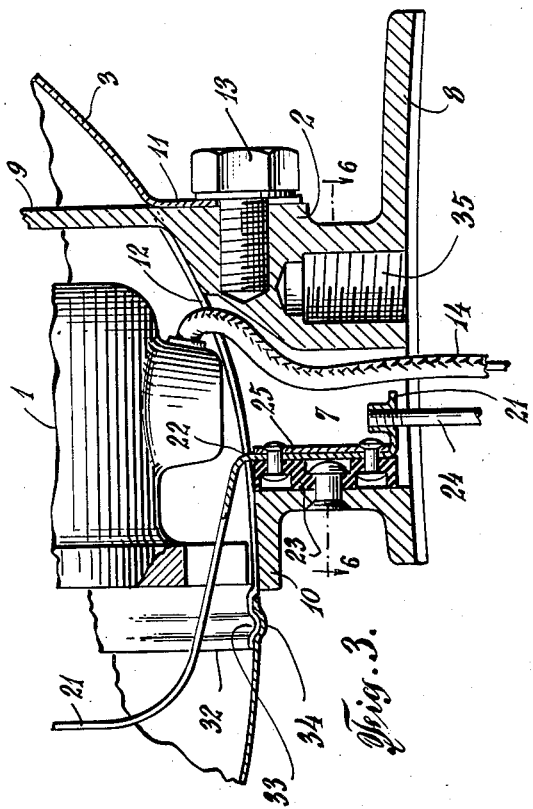
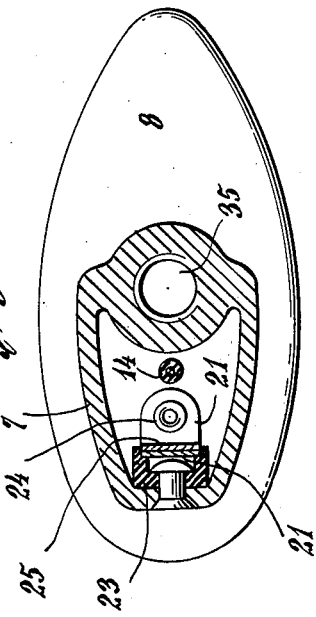
INVENTOR
Hermann Waker
BY
ATTORNEY Patented Mar. 12, 1935

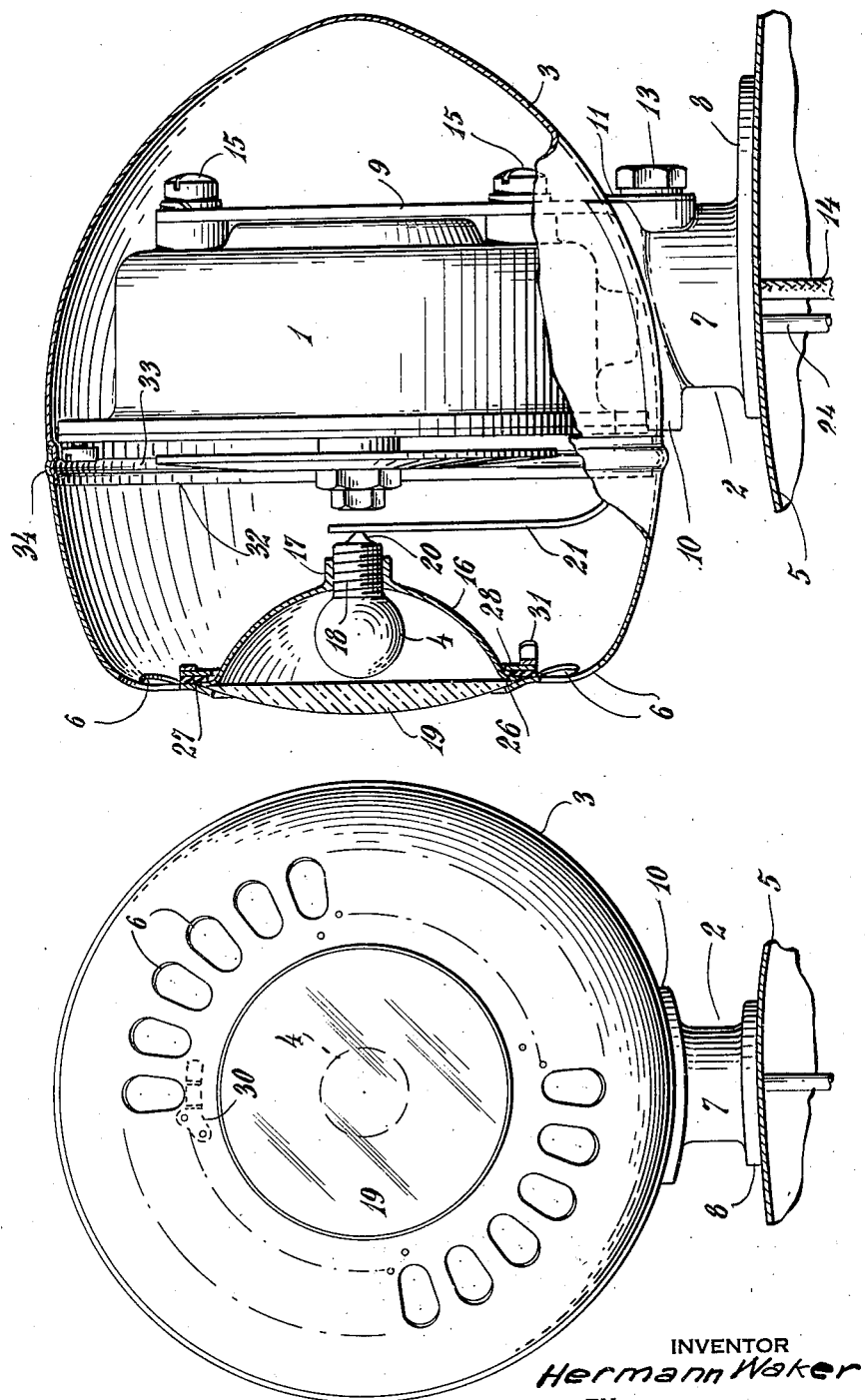

1,993,765

UNITED STATES PATENT OFFICE 1,993,765

COMBINED LAMP AND HORN

Hermann Waker, Springfield, Mass., assignor to United American Bosch Corporation, Springfield, Mass., a corporation of New York Application October 12, 1932, Serial No. 637,388

4 Claims. (Cl. 177—7)

This invention relates to a combined lamp and horn and particularly to an appliance for a motor vehicle with a lamp and horn in a single casing.

An object of the invention is to provide a strong and compact device of this nature with a horn mounted upon a suitable support, which also carries the lamp in front of the horn; the construction being adapted to be mounted upon the fender of the motor vehicle or some other convenient part in position to be easily reached by conductors which supply the energy to operate the device. The nature and the advantages of the invention are set forth in the accompanying drawings and the ensuing description and the right is of course reserved to make changes in details which do not depart from the principle of the invention or exceed the scope of the appended claims.

On the drawings:

Fig. 1 shows a front view of a unit containing both a lamp and a horn according to this invention;

Fig. 2 is a vertical longitudinal section, the lower part being in elevation;

Fig. 3 is a similar section through the lower part of the device;

Figs. 4 and 5 are front and rear views respectively of the support;

Fig. 6 is a horizontal section on the line 6—6 of Fig. 3; and

Figs. 7 and 8 illustrate the means for attaching the lamp to the casing.

On the drawings the same numerals identify the same parts throughout.

The device comprises an electrically operated horn 1 in a suitable housing which is affixed to a support 2. The support also carries the casing 3 in the front of which is disposed the lamp 4. The horn 1 is behind the lamp. The device can be mounted upon the fender 5 of an automobile or the like; preferably one of the front fenders, so that the horn is in advantageous position for signalling when the vehicle is in motion. In most cases the device will be made up in the form of a combined horn and parking light, but the same construction may also be adopted for the head lamps of the car if desired. In the front of the casing 3 surrounding the lamp 4 is a circular row of openings 6 to enable the sound of the horn to make its exit from the casing.

The support 2 comprises a hollow neck or base 7 at the bottom of which is a foot 8 which rests upon the fender 5 and from the rear of the neck rises an upright plate 9. At the junction of the neck with the plate 9 is a portion 10 having the form of a curved shelf concave on its upper face to fit the curvature of the casing 3. This casing has a portion which is cut out as shown at 11 leaving an opening 12 through which projection 9 extends into the casing. The portion 11 is bent outward and downward into vertical position and overlies part of the rear of the base 7 and is perforated to receive a screw 13 which secures the casing and the support together. The base or neck 7 is hollow and an electrical conductor 14 which carries the current to operate the horn 1 passes into the casing through the neck 7 and opening 12. The plate 9 has openings therein for screws 15 to enable the housing of the horn to be fastened to the plate 9.

As shown in Figs. 4 and 5 the plate or projection 9 is of reduced width adjacent the shelf 10 and the opening 12 is in the form of a recess in the bottom of the rear section of the casing 3 extending inward from the edge of the open mouth thereof. This recess is not as wide as the shelf 10 but is wide enough to receive the relatively narrow part of the plate 9 adjacent this shelf. Hence when the horn 1 is attached to the plate, the rear section of the casing can be placed over the horn from the rear by bringing the recess 12 into line with the plate 9 and moving this section of the casing forward until the projection 9 lies at the inner end of this recess and the portion 11 abuts the rear of the neck 7. The sides of the recess then rest upon the sides of the shelf 10; and the casing is firmly mounted on the support 2.

On the front of the casing, the lamp 4 is carried by reflector 16 having a neck 17 into which the neck 18 of the lamp is screwed. This reflector is disposed adjacent a large central opening in the front of the casing which is covered by a lens 19 in front of the lamp 4. One terminal of the filament of the lamp is of course connected to the return circuit through the reflector 16 and casing 3; while the other or insulated terminal of the filament shown at 20 makes contact with a conductor or terminal 21 in the form of a resilient strip of metal, that is bent into suitable shape and passes into the casing 3 through an opening 22 communicating with the interior of the neck 7. The outer end of the conductor 21 is within the neck 7 and is there connected to a conductor 24. This conductor 21 is held by means of rivets uniting it to a piece of insulation 23 which in turn is riveted to the support 2, and 25 is a plate which overlies the anchored end of the conductor 21 and enables it to be held more firmly. The insulation 23 is counter-sunk so that the rivets which fasten this insulation to the support 2 and to the conductor 21 do not make electrical connection between the conductor and the support 2.

The reflector 16 is of course concave on its front face and has an out-turned or flanged rim 26 between which and the rim of the front opening in the case 3 the lens 19 is gripped. Behind this rim 26 is a packing ring 27 and over this packing ring is a retaining ring 28 having projections 29 along its outer edge. To the interior of the front of the casing clips 30 are affixed, these clips having spring tongues 31 which engage the projections 29. As shown in Fig. 7, when the ring 28 is turned to carry the projections 29 behind the spring tongues 31, the ring 28 will be retained securely in position and prevent displacement of the reflector 16 and lens 19. At the same time these parts can be dismounted whenever necessary.

For convenience in assembling, the casing is made in two parts, the rear portion being permanently attached to the support 2 and having a reduced rim 32 surrounded by an external rib 33. The other portion of the casing carries the lamp reflector and lens and the edge of this portion fits over the reduced rim 32 of the other portion or section and has an inside groove 34 which receives the rib 33. The rim 32 and rib 33 may be resilient enough to be forced into place so that the groove 34 receives the rib 33 and the two parts or sections of the casing are held together tightly but are at the same time detachable, so that the front section can be taken off at will in case any of the parts in the inside of the casing need inspection or repair, or replacing of any of the members of the device is necessary. Of course the rings 27 and 28 lie within the compass of the openings 6 so that these openings are not obstructed.

The support 2 has a threaded opening 35 at the bottom for a screw or fastening member to enable it to be held on the fender 5.

The device is therefore very durable in construction, well housed, protected and mounted and at the same time access can easily be had to the inside casing when needed.

Having described the invention, what is claimed is:

1. In an article of manufacture, the combination of a casing comprising front and rear detachable sections, a support having a hollow base for the casing, a horn in the casing, both the horn and the rear section of the casing being affixed to the support, the base of said support having a shelf on the top of which the casing rests and a plate projecting into the casing to enable the horn to be mounted on the support, said casing having a part cut and bent outward to provide an opening for the plate on said support, said part being affixed to the base of the support, the front section of the casing having a row of openings and a central aperture, a lens and reflector adjacent said aperture, a lamp carried by the reflector, a conductor member secured inside the base of the support and engaging a contact on said lamp, insulation between said member and said support, a ring surrounding the rim of the reflector and having projections on its outer edge, and clips inside the front section of the casing to engage the projections on said ring to hold the reflector and the lens in place, said parts forming a compact unit.

2. The combination of a casing, a support therefor, the support having a shelf and a projection adjacent one end of the shelf passing into the casing, the projection being narrower than the shelf adjacent the latter and the casing having a recess to receive the narrow portion of the projection but of less width than the shelf so that the portions of the casing at the sides of said recess may rest upon the shelf.

3. The combination of a casing comprising front and rear detachable sections, a support having a hollow base for the casing, a horn in the casing, both the horn and the rear section of the casing being directly affixed to the support, the base of the support having a shelf on the top of which the casing rests and a plate rigid with the support and projecting into the casing to enable the horn to be mounted on the support, said rear section having a recess in its edge, the plate passing through said recess, the portions of said rear section at the sides of said recess engaging said shelf and means for securing the casing to said support.

4. The combination of a casing, a horn in said casing, a support, a cut portion bent outward from said casing and means for attaching said portion to said support, a projection on said support extending into said casing adjacent said portion, and means for attaching said horn to said projection.

HERMANN WAKER.